United States Patent
Young

(10) Patent No.: US 6,706,111 B1
(45) Date of Patent: Mar. 16, 2004

(54) METHOD FOR PRETREATING COMPONENTS OF A CEMENTITIOUS COMPOSITION TO CONTROL ADSORPTION POTENTIAL

(75) Inventor: Robert Douglas Young, San Antonio, TX (US)

(73) Assignee: Mainland Laboratory, Ltd., San Antonio, TX (US)

( * ) Notice: Subject to any disclaimer, the term of this patent is extended or adjusted under 35 U.S.C. 154(b) by 138 days.

(21) Appl. No.: 09/830,238

(22) PCT Filed: Aug. 3, 2000

(86) PCT No.: PCT/US00/21205

§ 371 (c)(1),
(2), (4) Date: Apr. 24, 2001

(87) PCT Pub. No.: WO01/09055

PCT Pub. Date: Feb. 8, 2001

Related U.S. Application Data

(60) Provisional application No. 60/169,657, filed on Dec. 8, 1999, and provisional application No. 60/146,854, filed on Aug. 3, 1999.

(51) Int. Cl.[7] .............................................. C04B 18/08
(52) U.S. Cl. ................................. 106/705; 106/DIG. 1; 264/DIG. 49
(58) Field of Search ........................... 106/705, DIG. 1; 264/DIG. 49

(56) References Cited

U.S. PATENT DOCUMENTS

| | | | |
|---|---|---|---|
| 4,257,815 A | 3/1981 | Hauser | |
| 4,453,978 A | 6/1984 | Okimura et al. | |
| 4,828,619 A | 5/1989 | Matsushita et al. | |
| 4,961,790 A | 10/1990 | Smith et al. | |
| 5,110,362 A | 5/1992 | Hoarty et al. | |
| 5,120,367 A | 6/1992 | Smith et al. | |
| 5,286,292 A | 2/1994 | Tsukada et al. | |
| 5,328,507 A | 7/1994 | Crocker | |
| 5,366,637 A | * 11/1994 | Turunc | 210/728 |
| 5,472,499 A | 12/1995 | Crocker | |
| 5,654,352 A | 8/1997 | MacDonald | |

FOREIGN PATENT DOCUMENTS

| | | | |
|---|---|---|---|
| JP | 0524900 | * | 2/1993 |
| JP | 8337449 | * | 12/1996 |

OTHER PUBLICATIONS

"The Trouble With Bubble", Concrete Journal, Aug. 1996.

"Blending Fly Ash For A Better Concrete", The Concrete Producer, Jun. 1998.

International Clean Coal Technology Symposium On Coal Ash Utilization, Feb. 27–29, 1996.

* cited by examiner

Primary Examiner—Paul Marcantoni
(74) Attorney, Agent, or Firm—Jackson Walker L.L.P.

(57) ABSTRACT

A method for pretreating a carrier component for a cementitious composition. A quantity of any component of a cementitious composition is analyzed to determine its adsorption potential in the composition. The quantity of the component is treated with an effective amount of a treatment agent to control the adsorption potential.

3 Claims, 4 Drawing Sheets

METHOD FOR PRETREATING COMPONENTS OF A CEMENTITIOUS COMPOSITION TO CONTROL ADSORPTION POTENTIAL

This application claims priority under 35 U.S.C. §120 to PCT Application Ser. No. PCT/US00/21205, filed Aug. 3, 2000; U.S. Provisional Application Ser. No. 60/146,854, filed Aug. 3, 1999; and U.S. Provisional Application Ser. No. 60/169,657, filed Dec. 8, 1999, both of which are fully incorporated herein by reference.

FIELD OF THE INVENTION

Applicant's invention relates to a method of pretreating any component of a cementitious composition, particularly ash, that exhibits a high or highly varying adsorption characteristic, or both. The treatment method transforms the chemical adsorption characteristic of the component to a low constant value for use in processes that utilize the component. An important aspect of the present invention is that the method shifts the process of controlling the adsorption effects of the components from the end user to the component marketer.

The present invention relates to a method of treating a component or components of a cementitious composition that contains an appropriate surface morphology, such as that exhibited by unburned carbon or zeolite materials in fly ash, or both, for which the component exhibits the ability to adsorb chemicals from an aqueous solution.

The approach of the method is to satiate the adsorptive potential associated with the surface morphology by adding effective, trace amounts of a treatment agent or agents to the component(s) prior to addition of the component to the composition slurry. Thus, satiation of the adsorption potential occurs only after the treated component is placed in an aqueous solution. It is believed the addition to the aqueous solution (the composition slurry) enables mass transport of the intentionally added effective, trace amount of agent(s) to the adsorption sites.

BACKGROUND OF THE INVENTION

Traditionally, the air entrainment quality of a cementitious composition has been controlled by the end user of the composition. Because of high or high variable adsorption characteristics, or both, the end user has the tedious task of adding the proper quantities of the various components of the cementitious composition. It is often by trial and error that a proper mix is achieved. There is a tremendous need for a way to control the consistency of the adsorption characteristics of mix components at the component supplier. There are numerous components of cementitious compositions which have varying adsorption potentials requiring control. These include ash, sand, cement aggregates, crushed stone, gravels, mortars, cements, clay, lime, lime sand, limestone, and various siliceous and aluminous materials.

While the discussion below focuses on fly ash as a component with high or highly variable adsorptive characteristics, it should be understood that any of the above identified components (and their equivalents) may be pretreated as discussed. The principles set forth are applicable to all of these components.

Ash is a byproduct of the combustion process. The major producer of ash in the United States is coal fired power plants, which generate on the order of $1 \times 10^8$ tons of fly and bottom ash annually.

A significant portion of the ash is pozzolanic in nature, which means that in the presence of moisture the ash will react with calcium hydroxide at ordinary temperatures to form compounds possessing cementitious properties. This pozzolanic nature of ash enables ash to be substituted for Portland cement in concrete in amounts up to 50%. While there are other uses for ash, the use of ash in concrete represents the single largest application that beneficially utilizes ash in a product. Unfortunately, however, the majority of ash that is generated at coal fired power plants is never utilized.

Federal clean air standards imposed upon coal burning power plants caused the power plants to reduce the combustion temperature in the boilers in order to reduce $NO_x$ emissions. The reduced combustion temperature causes a substantial increase in the amount of unburned carbon present in the ash. As a result of the thermal cycle, the unburned carbon in the ash exhibits some of the characteristics of a low-grade activated carbon, in particular, the ability to adsorb a wide range of chemicals. Traditionally ash with a high amount of unburned carbon is referred to as an ash with a high loss on ignition (LOI) content. LOI occurs when the ash is heated in the presence of air to temperatures that completely combust the unburned carbon to gaseous $CO_2$. Ash with high LOI has traditionally been considered to be ash with high adsorption potential.

The adsorption potential of a high LOI ash is detrimental to the use of the ash as a Portland substitute in concrete due to the ash's tendency to adsorb important cementitious chemical admixtures from the concrete during the mixing process rendering the admixtures unavailable to effect their intended purpose. Virtually all large scale commercial concrete applications require the use of cementitious admixtures for purposes such as entraining air for freeze-thaw protection, reducing water content for higher strength, and retarding or accelerating the initial set of the concrete.

However, it has been found that LOI is not a good indicator of ash adsorption potential. The specific amount of unburned carbon in the ash is a function of the specific combustion condition of the boiler when the coal is burned. Changing demands for electrical power result in changing combustion conditions which in turn results in varying amounts of unburned carbon in the ash. The variability associated with the amount of unburned carbon in the ash increases with increasing LOI. Thus, different loads of ash that are delivered to the concrete manufacturer will differ in LOI content and the amount of difference increases as the average LOI content increases. In addition, the changing combustion conditions influence the surface morphology of the unburned carbon, which directly influences the specific adsorption potential of the unburned carbon. Therefore, two different ash samples with the same LOI can exhibit radically different adsorption potentials. Furthermore, some combustion conditions can produce a surface morphology on the mineral phase of the ash that is capable of adsorption in a manner analogous to activated carbon. This zeolitic type of adsorption cannot be predicted based on the LOI of the ash.

The continuously varying adsorption potential of the ash (and all of the components to the cementitious composition) means that the admixture dosage necessary to compensate for the adsorption effect does not remain constant. The concrete industry, as a whole, is a low technology industry with low profit margins, and as such employs a trial and error method of determining the necessary compensatory admixture dosage. The combination of increased variability of the component adsorption potential with increasing LOI, low correlation between LOI and true adsorption potential of the component, and the trial and error method of determining the compensatory admixture dosage has resulted in enough off specification concrete to cause state regulatory bodies to lower the maximum ash LOI that is permitted to be used in concrete manufactured under their respective jurisdictions.

The concrete industry has responded to this problem by trying to develop admixtures that are both effective for their intended purpose and are not adsorbed by carbon. U.S. Pat. Nos. 4,453,978; 4,828,619; 5,110,362; and 5,654,352, teach and illustrate approaches to resolving this current problem. The methods have not been successful.

For example, the fundamental problem with developing admixtures that do not adsorb into the surface of carbon in ash is the wide range of surface morphologies that are produced on the carbon and mineral phases that are present in the ash by the differing combustion environments associated with the coal fired power plants.

U.S. Pat. No. 5,286,292 issued to Tsukada et al. introduced a new approach of satiating the adsorption potential of the ash before the ash is used. Their approach is to expose the ash to halogen gas (preferably fluorine or chlorine) which readily adsorbs onto the surface of the unburned carbon. Their preferred embodiment includes placing the ash into an enclosed vessel followed by the introduction of the fluorine and/or chlorine gas for a time period from 10 to 60 minutes. After this time, the prepared ash is usable as a Portland substitute without appreciable admixture adsorption by the unburned carbon in the ash.

Several problems have inhibited commercial implementation of Tsukata's approach. Fluorine and chlorine gas are highly corrosive and are potentially lethal in relatively small doses to living organisms. Furthermore, the capital required to build a treatment facility from special corrosive resistant materials is high. In addition, the cost of the gas is high relative to the selling price of the ash. Additionally, changing environmental conditions can cause desorption of the gas from the unburned carbon in the ash thereby releasing this highly corrosive and potentially lethal gas into the atmosphere for possible exposure to both equipment and personnel downstream from the treatment facility.

The approach of the present invention is to provide a treatment and method for treating the ash without the problems of the known art. In the present invention, trace amounts of solid and/or liquid chemicals are added to the ash prior to the use of the ash in a subsequent process in order to mitigate the adsorption potential of the ash. Implementation of the approach of the present invention is well suited for either the ash generator or ash marketer because this approach results in greater product uniformity and eliminates the end user's concern over the adsorption effect of the unburned carbon in the ash. Unlike Tsukata's approach, the present invention does not satiate the unburned carbon during the treatment process, but rather the process enables the correct amount of chemicals to be present in the ash so as to satiate the adsorption effect when the ash is in an aqueous solution. Chemicals found to be useful for this purpose are members of the family of chemicals that strongly adsorb onto carbon and/or zeolitic substrates. Several highly effective chemicals have been identified that are not corrosive, not harmful to the environment, do not pose a health risk to personnel handling the ash, remain in the ash with changing environmental conditions, and are very inexpensive relative to the selling price of the ash. The exact treatment chemical used for a given ash is tailored for the specific surface chemistry and morphology of the subject ash.

SUMMARY OF THE INVENTION

An object of the present invention is to provide a novel treatment and method for treating any component or components of a cementitious composition that utilizes a treatment chemical or agent that is supplied to the component before the component is introduced into the utilizing process to control the apparent chemical adsorption potential of the component.

It is an object of the present invention to provide a novel treatment and method for treating any component(s) of a cementitious composition that lowers its adsorption potential, particularly for chemicals added during the utilizing process.

It is another object of the present invention to provide a novel treatment and method for treating any component(s) of a cementitious composition that controls its adsorption potential, particularly for chemicals added during the utilizing process.

Yet another object of the present invention is to provide a novel treatment and method for treating any component(s) of a cementitious composition that produces a component(s) with a consistent adsorption potential, particularly for chemicals added during the utilizing process.

Still another object of the present invention is to provide a novel treatment and method for treating any component(s) of a cementitious composition that controls the adsorption potential of component so as to easily accommodate the wide variety of surface morphologies and specific activities of both components from different sources and from a single source that changes with time.

It is yet another object of the present invention to provide a novel treatment and method for treating any component(s) of a cementitious composition that transforms ash into a useful raw material that the commercial market is willing and able to purchase and consume.

Another object of the present invention is to provide a novel treatment and method for treating ash that introduces the treatment chemical or chemicals into commercially "bad" ash simply, easily, and of low capital cost such that the total treatment cost of the ash is a very small fraction of the commercial selling price of the treated ash.

Still another object of the present invention is to provide a novel treatment and method for treating ash that does not pose an increased threat to the environment, to the health or safety of workers, or to equipment exposed to the treated ash relative to the untreated ash.

It is still another object of the present invention to provide a novel treatment and method for treating any component(s) of a cementitious composition that involves dispensing trace amounts of a treatment chemical or agents into the component before the component is used in any process.

Yet another object of the present invention is to provide a novel treatment and method for treating any component(s) of a cementitious composition that involves a treatment chemical or agents that works in combination with the utilizing process to produce the effect of controlling the apparent chemical adsorption potential of the component in that process.

It is another object of the present invention to provide a novel treatment and method for treating any component(s) of a cementitious composition that utilizes a treatment chemical or chemicals that strongly adsorbs onto carbon and/or zeolitic surfaces.

Still another object of the present invention is to provide a novel treatment and method for treating any component(s)

of a cementitious composition that utilizes a treatment chemical or chemicals that does not have a detrimental effect on the utilizing process.

It is yet another object of the present invention to provide a novel treatment and method for treating any component(s) of a cementitious composition that utilizes a treatment chemical or chemicals that is a surfactant.

Yet another object of the present invention is to provide a novel treatment and method for treating any component(s) of a cementitious composition that utilizes a treatment chemical or chemicals that is a nonionic surfactant.

It is still another object of the present invention to provide a novel treatment and method for treating any component(s) of a cementitious composition that utilizes a treatment chemical or chemicals that is an ethoxylate.

Another object of the present invention is to provide a novel treatment and method for treating any component(s) of a cementitious composition that utilizes a treatment chemical or chemicals that is a nonylphenol ethoxylate.

It is another object of the present invention to provide a novel treatment and method for treating ash that utilizes a treatment chemical or chemicals in an amount in the range of about 0.001% to about 20.0% solid to solid, and, preferably, in the range of about 0.001% to about 2.0% solid to solid.

Yet another object of the present invention is to provide a novel treatment and method for treating any component(s) of a cementitious composition that utilizes a treatment chemical or chemicals that remains in the component or final product with changing environmental conditions.

It is another object of the present invention to provide a novel treatment and method for treating any component(s) of a cementitious composition that utilizes a treatment chemical or chemicals for the component that becomes effective when the component is placed in an aqueous solution.

Still another object of the present invention is to provide a novel treatment and method for treating any component(s) of a cementitious composition that utilizes a treatment chemical or chemicals that is an anionic surfactant.

Another object of the present invention is to provide a novel treatment and method for treating ash that utilizes a treatment chemical or chemicals that is sodium lauryl sulfate.

In satisfaction of these and related objectives, applicant's present invention provides for a novel treatment and method for treating any component(s) of a cementitious composition that involves dispersing amounts (even trace amounts) of a treatment chemical or agents into the component before the component is used in a utilizing process. The treatment chemical or chemicals work in combination with the utilizing process to produce the effect of controlling the apparent chemical adsorption potential of the component in the utilizing process. At the initial step, a treatment chemical or chemicals is selected. Here, a subfamily of chemicals that beneficially interact with both the intended component and the utilizing process are selected from a family of chemicals that strongly adsorb onto carbon and/or zeolitic substrates. A subset of chemicals is next selected from the subfamily of chemicals which would not realistically increase the risk to the environment, workers' health or safety, or integrity of equipment that is exposed to the treated component relative to the risks imposed by untreated component. Next, a candidate set of chemicals is selected from the subset of chemicals for which the cost of treatment is significantly below the commercial selling price of the treated component. Next, the necessary or effective amount of the treatment chemical or chemicals is determined and the treatment chemical or chemicals is prepared for introduction into the component. Last, the treatment chemical or chemicals is introduced into the component using one or more of batch mixing, combined flow, or other appropriate method or methods.

DETAILED DESCRIPTION OF THE PREFERRED EMBODIMENT

Extensive research and development efforts by many researchers over the last two decades have been focused on identifying a commercially viable method of controlling the adsorption potential of components to cementitious compositions, particularly fly ash. Applicant discovered that the apparent adsorption potential of an ash could be drastically altered relative to a subsequent process that utilizes the ash, often referred to as the utilizing process. This can be accomplished by dispersing a trace amount of a treatment chemical or agents (including inorganic, mineral agents) into the ash before the ash is incorporated into a utilizing process. This invention has particular utility for the ash generator or ash disposal agent. Ash possessing a consistently low adsorption potential is marketable as a pozzolan into products such as concrete. However, highly adsorptive ash or ash with highly varying adsorption potential, or both, is usually not marketable because the use of the ash can cause problems with the control of process utilizing the ash. By dispersing the trace amount of treatment chemical or agents into the ash, ash with varying adsorption potential is transformed into an ash with a low and consistent adsorption potential relative to the utilizing process. As such, undesirable ash is transformed into a desirable and marketable product for both the ash generator and the ash disposal agent. While the present invention speaks preferably to a treatment and method of treating ash with high and/or highly varying adsorption potential, the present invention is also applicable to other components of cementitious composition as was discussed above.

Figure 1:
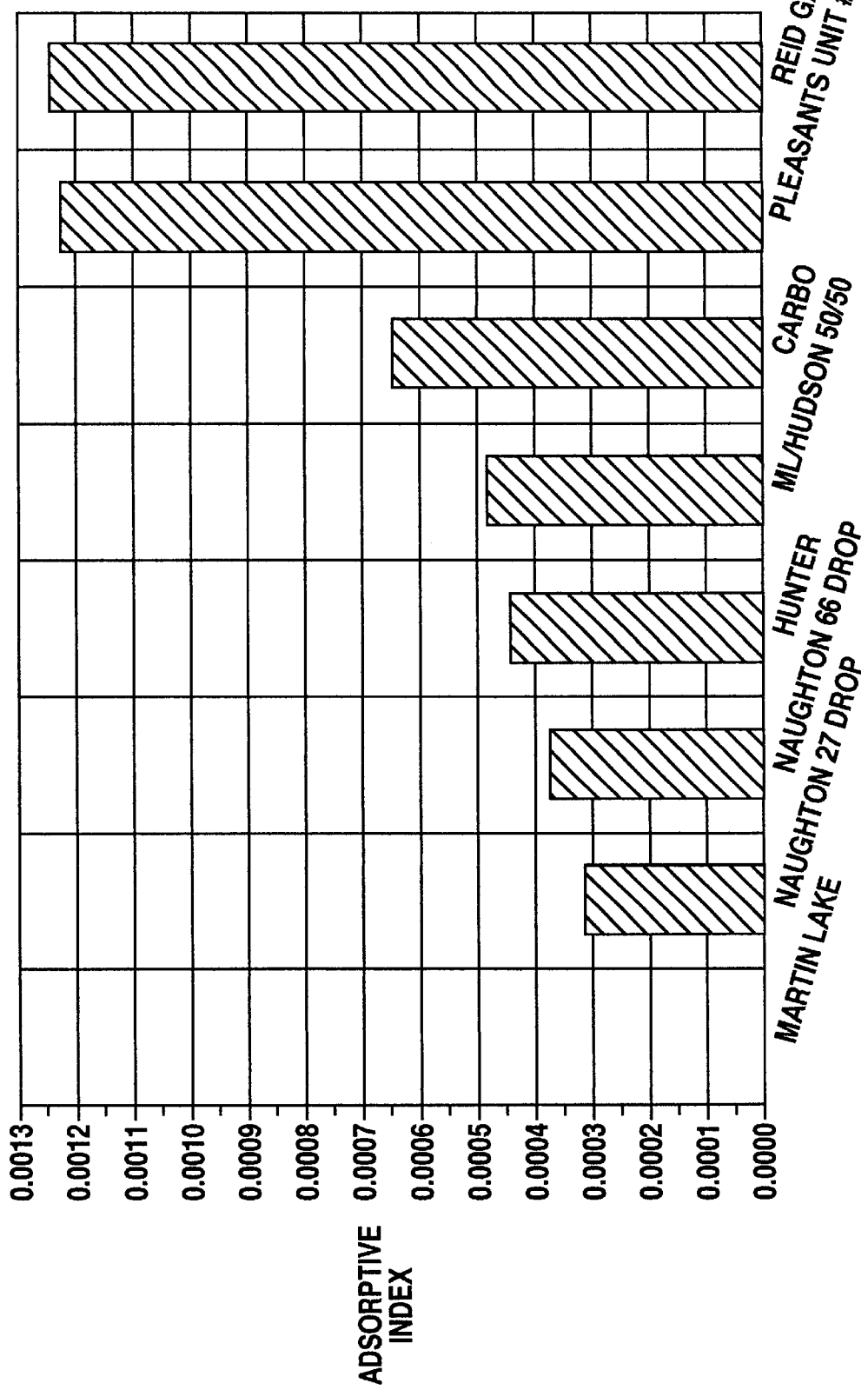
FIG. 1 is a chart of adsorptive indices for various ash types.
Figure 2:
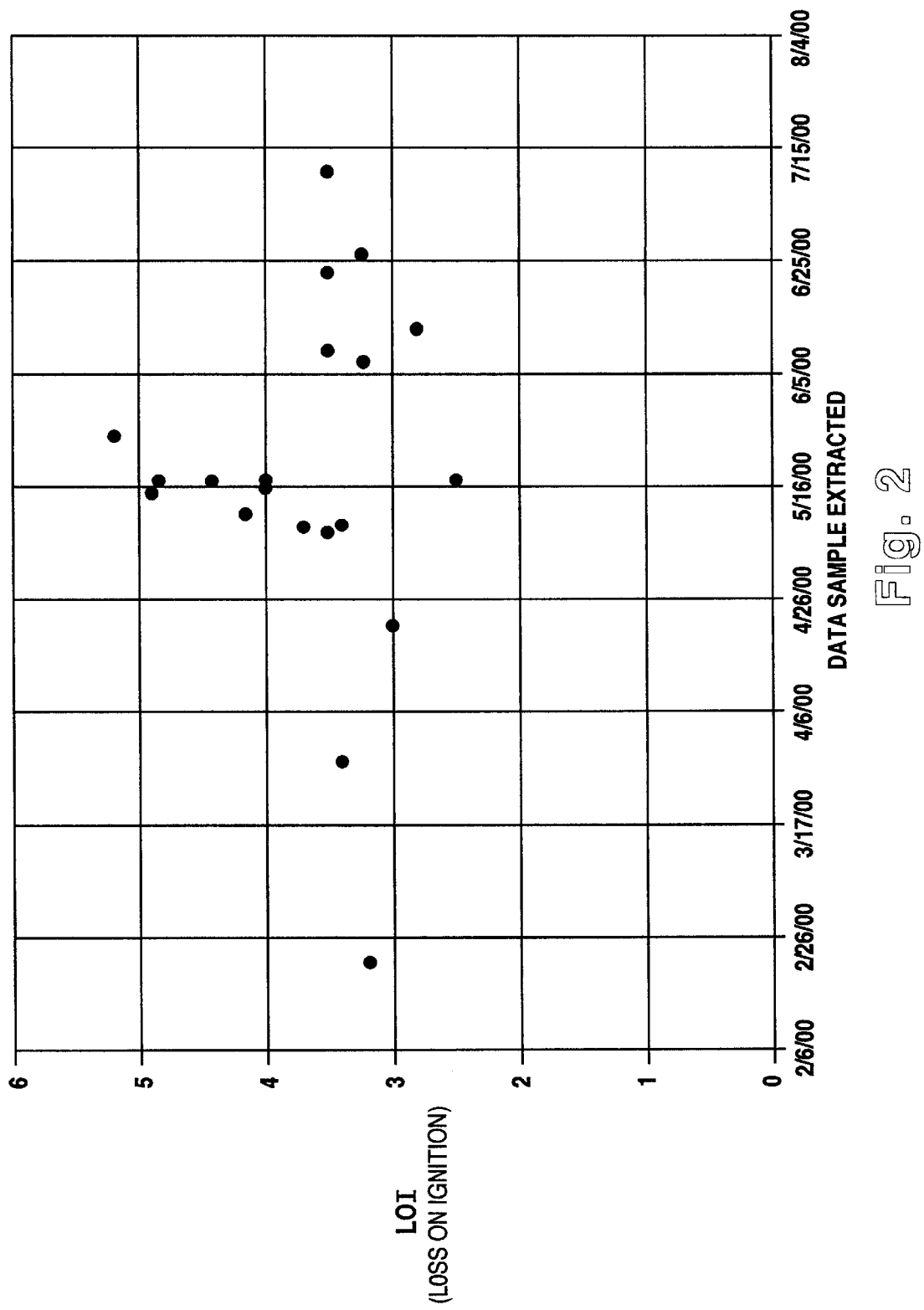
FIG. 2 is a chart of time resolved LOI for Carbo Power Plant ash.

In the present invention, applicant has developed a treatment and method of treating a component that exhibits high and/or highly varying chemical adsorption potential. For the present invention LOI is not used as a measure of adsorptive potential due to the low degree of correlation between LOI and the adsorptive potential. The adsorption potential of a sample component, for example, ash, is however quantified by measuring the specific amount of Methylene Blue ($C_{16}H_{18}ClN_3S$) that the ash adsorbs when placed in an aqueous solution. The weight of Methylene Blue adsorbed by the ash divided by the weight of the ash is referred to as the material adsorptive index for the sample ash. For example, one pound of Methylene Blue adsorbed by 1000 pounds of ash would equate to a material adsorptive index of 0.001. A chart of adsorptive indices for various ash types is illustrated in FIG. 1. A chart of LOI variations as a function of adsorptive index is shown in FIG. 2. It should be understood that similar charts may be prepared for other components of cementitious compositions including sand, cement, stone, crushed stone, gravel, mortar, cement aggregates, clay, lime, limestone, and various siliceous and aluminum materials.

When the adsorption potential of the component is high and/or highly varying then the component should be treated in accordance with the present invention. This begins with the selection of a treatment chemical or chemicals. Selection of the treatment chemical or chemicals for functionality is based upon the morphological aspects of the component and the compatibility with the targeted application. The adsorption of chemicals onto the surface of component is a complicated subject, which is further exacerbated by continual changes in the surface morphology of the component or components, and in the case of ash, induced in part by changing operational conditions at the ash generating plant. It is difficult to predict initially which chemical or chemicals will adsorb best on any given component. However, the preferred chemical or chemicals will possess all or most of the following characteristics.

A subfamily of chemicals that beneficially interact with both the intended component, components, or ash and the process of interest are selected from a family of chemicals that adsorb, preferably strongly, onto carbon and/or zeolitic surfaces. Due to the myriad of possible detrimental interactions, candidate treatment chemicals must be identified using an experimental approach. Next, a subset of chemicals is selected from the subfamily of chemicals which would not realistically increase the risk to the environment, workers' health and safety, or integrity of the equipment that is exposed to the treated ash relative to the risks imposed by untreated ash. A candidate set of chemicals is then selected from the subset of chemicals for which the cost of treatment is significantly below the commercial selling price of the treated ash.

Figure 3:
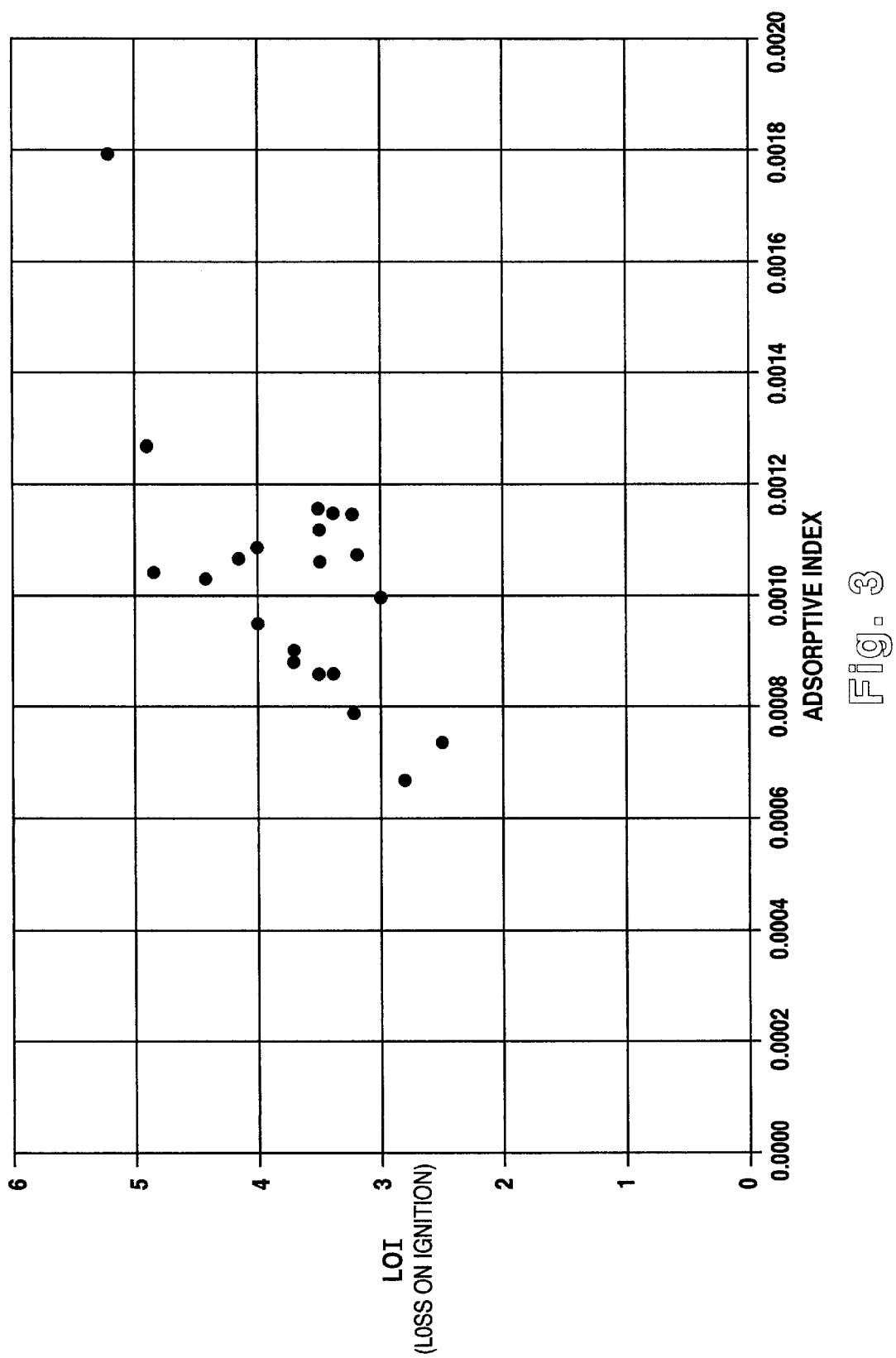
FIG. 3 is a chart of LOI versus Adsorptive Index.

One subfamily of chemicals shown to be useful in the embodiments is detergents including surfactants and emulsifiers. Initial tests utilized anionic surfactants, more particularly sodium lauryl sulfate (SLS), as the treatment chemical, and favorable results were obtained. However, after further experimentation it was found that another surfactant for use was nonionic; namely, an ethoxylate, and more particularly, a nonylphenol ethoxylate surfactant (NP-9). The nonylphenol ethoxylate has been shown to be highly effective at controlling the apparent adsorption potential of Carbo ash, an ash used as a Portland replacement in concrete in the amount of 20% in a certain area of the United States. A chart of time resolved LOI for the Carbo Power Plant ash is illustrated in FIG. 3. In addition, the treated ash does not adversely affect the other chemical admixtures that are added to the concrete by the manufacturers. For the required treatment dosage, preferably on the order of 0.1%, this treated ash does not pose an environmental, safety, or health risk relative to the untreated ash, and the treatment cost is on the order of a few percent of the selling price of the ash to the concrete manufacturer.

Once the treatment chemical or chemicals is determined, the weight of this treatment chemical or chemicals to be added to the ash must be determined. To determine this weight a scale factor is experimentally determined for the treatment chemical or chemicals. This scale factor is then multiplied by the material adsorptive index to determine the appropriate weight of treatment chemical or chemicals. The scale factor for nonylphenol ethoxylate has been found by experimentation to be 0.57. Overall it is preferred that only a trace amount of treatment chemical or chemicals be added to the ash. This trace amount will be in the range of about 0.001% to about 2.0% solid to solid, and yet may be as broad as about 0.001% to about 20% solid to solid in some unusual cases.

Once the treatment chemical or chemicals is selected and the necessary treatment weight is determined, the treatment chemical or chemicals must be prepared for introduction into the ash. Solid chemicals are ground or milled into fine particulate powders. Liquids can be atomized or formed into aerosols, or can be adsorbed into fine particulate ash, clay or other suitable carrier substrate material. All chemicals that exist unaltered from their intended structure when heated to a vapor state can be vapor deposited onto fine particulate ash, clay or other suitable carrier substrate material.

After the treatment chemical or chemicals is prepared, there are two fundamental methods that can be used to disperse the treatment chemical or chemicals into the component. These include mixing and combined flows. Mixing involves the use of either a batch or continuous mixer and usually requires the use of two or more containers to buffer the flow of ash for loading the untreated ash into the mixer and unloading the treated ash. Examples of such containers include silos and transportation containers. The form of the treatment chemical or chemicals used for mixing can be solid in the form of a fine particulate, a liquid, a liquid adsorbed onto a substrate such as clay or ash, or a chemical that is vapor deposited onto a suitable substrate such as clay or ash. The degree of dispersion of the treatment chemical or chemicals into the ash is dependent upon the mixing time and the design of the mixer. Introduction of the treatment chemical or chemicals into the ash by the mixing method is well suited for treatment at the facilities of the ash generator, ash marketer, and end user of the ash.

Although mixing is an effective means of dispersing the treatment chemical or chemicals into the ash, combined flows is a preferred method which can be implemented at low cost, can treat ash faster, and can effectively disperse the treatment chemical or chemicals into the ash. The combined flows method combines one or more ash flows with one or more treatment chemical flows utilizing either naturally or artificially induced turbulence as the means of dispersing the treatment chemical or chemicals into the ash. This method has high utility because flows of ash already exist to move the ash around the ash generation facility, ash terminal facility and end user facility. Examples where the combined flows method is useful include, but are not limited to, the flow of flue gas which transports the ash from the boiler to either a precipitator or a storage silo, between storage silos, or between a silo and some form of transportation container. Although solids in the form of a fine particulate, liquids adsorbed onto a fine particulate, or chemicals vapor deposited onto a fine particulate can be used, the combined flows method is particularly useful when atomized liquids or aerosols are used.

The presumed mechanism of the present invention is competitive adsorption. In other words the addition of a trace amount of chemical to the component does not inherently alter the characteristic morphological surface adsorption at the particulate level. It is presumed that the component acts as a carrier to deliver the correct dosage of treatment chemical to the utilizing process. The utilizing process enables the conditions for the treatment chemical or chemicals to compete for the adsorption sites in the component, thus leaving the chemicals that are intentionally added to the utilizing process for their intended purpose.

For example, the adsorption coefficient of a component is quantifiable by measuring the specific amount of Methylene Blue adsorbed by the component when placed in an aqueous solution. Any other known techniques, such as BET, may be utilized to obtain such a coefficient.

EXAMPLES

Example 1

The present disclosure contemplates an additive or agent which is mixed in the fly ash (having unburned carbon or activated charcoal) in a relatively small portion. As will be detailed, this is easier than attempting to extract the unburned carbon or activated charcoal. The unburned carbon is so evenly distributed and widely dispersed that it is a practical impossibility to extract it. While it can be exposed to subsequent heat and the temperature raised so high that the unburned carbon is cormbusted, that is a counter productive process because the heat impacts other aspects of the mixture. Keeping in mind that fly ash is indeed a mixture, the better process is to assay the fly ash and determine the presence or absence of activated charcoal or unburned carbon. If present in any amount, and especially above about 1%, then the activated charcoal needs to be treated in accordance with the procedure suggested by this disclosure. The fly ash thereby obtains a controlled adsorption potential.

Consider the following test to determine the presence or absence of this form of carbon, i.e., activated charcoal in the fly ash. Assume that the fly ash is in particulate form. Assume also that the particles typically have sizes ranging from about 0.1 microns up to about 100 microns. No special effort is made to classify or to further grind the particles. In triple distilled water, preferably 200 grams of water, 80 grams of the particulate fly ash are stirred in. They are mixed in a blender for 10 seconds. Then, the test is conducted. The test uses a product provided by Master Builder, which is identified as the VR air entraining agent. That is added one drop at a time and the fly ash in the water is visually observed. By visual observation, the test is carried out to determine how many drops of the agent are required. If more than 10 drops are required, then the fly ash is not suitable. It is not suitable because it will degrade air entrainment. So long as the VR entrainment agent requires fewer than 10 drops, then the fly ash is assayed as a usable and useful additive. This test protocol, described below as the foam index test, is essentially a well known standard to determine the acceptance or rejection of fly ash for use in cement based products. Sometimes, the fly ash is so laden with the activated carbon that it takes upwards of several hundred drops, even as many as 600 it drops of the VR agent added to observe the change indicative of air bubble entrainment. In effect, that 600 drop measure is indicative of a serious problem in the fly ash. By contrast, if the foam index test requires only a few drops of the agent, then the fly ash can be successfully added in the slurry and the finished and cured concrete will not be susceptible to damage during cold weather.

The present disclosure contemplates an additive to the fly ash which negates the previously discussed air entrainment problem. As noted, that problem traces from the presence of the chemically active charcoal, i.e., elemental carbon distributed randomly throughout the fly ash. It has been discovered that the addition of a readily available detergent changes the characteristics. In particular, the detergent is an anionic surfactant which enhances the separation of selected materials. The detergent is sodium lauryl sulfate, identified below as SLS. Technically, SLS is given by the formula of $N_a$ $CH_3(CH_2)_{11}$ $SO_4$. This sulfate uses the four oxygen atoms to provide a negative charge countered by the reactive sodium. The lauryl is defined as an alkane chain. When added in small quantities, typically in the range of about 0.1% to about 1% by weight to fly ash, it is effective to negate the activated charcoal impact. Moreover, and again dependent on the amount of charcoal actually available, the preferred amounts of SLS added typically are about 0.1% to about 0.5% by weight. By mixing the SLS with the fly ash prior to mixing into the cement slurry, the fly ash is thereby modified.

Example 2

It was discovered that an ash treated with a surfactant, an ethoxylate, and more specifically a nonylphenol ethoxylate, by atomizing the surfactant into a flow of ash will exhibit a reduction in the amount of Methylene Blue that is adsorbed by the ash. The adsorptive sites on the surface of the ash are not satiated by the surfactant at the time of treatment but by the process of placing the ash in aqueous solution. The solution enables mass transport for the surfactant to reach the adsorption sites on the ash.

It should be understood that there are numerous analytical techniques for evaluating or determining an adsorption coefficient or factor which correlates to the adsorption potential of the cementitious composition. The present invention may utilize any of these known (or even yet to be discovered) techniques, but the amount of treatment agent to be added to the given component is proportional to the amount of the component.

It is also possible that the treatment chemical or chemicals will be the same chemicals that are intentionally added by the utilizing process, such as cementitious admixtures that may be added during concrete manufacturing. However, since the utility of the present invention relies on the pretreatment of the ash before the utilizing process, in most cases the treatment chemical or chemicals will differ from chemicals intentionally added during the utilizing process.

As previously stated, the present invention can also be used to process one or more individual components of the cementitious mix. An air entrainment agent (AEA) or treatment agent is added to compensate for adsorbtivity mandated by that component. The resulting AEA "compensated" components can then be shipped to a remote batch mixing facility where only air entrainment agents (mandated by the performance specifications of the mix) may be added to the blend of components.

Figure 4:
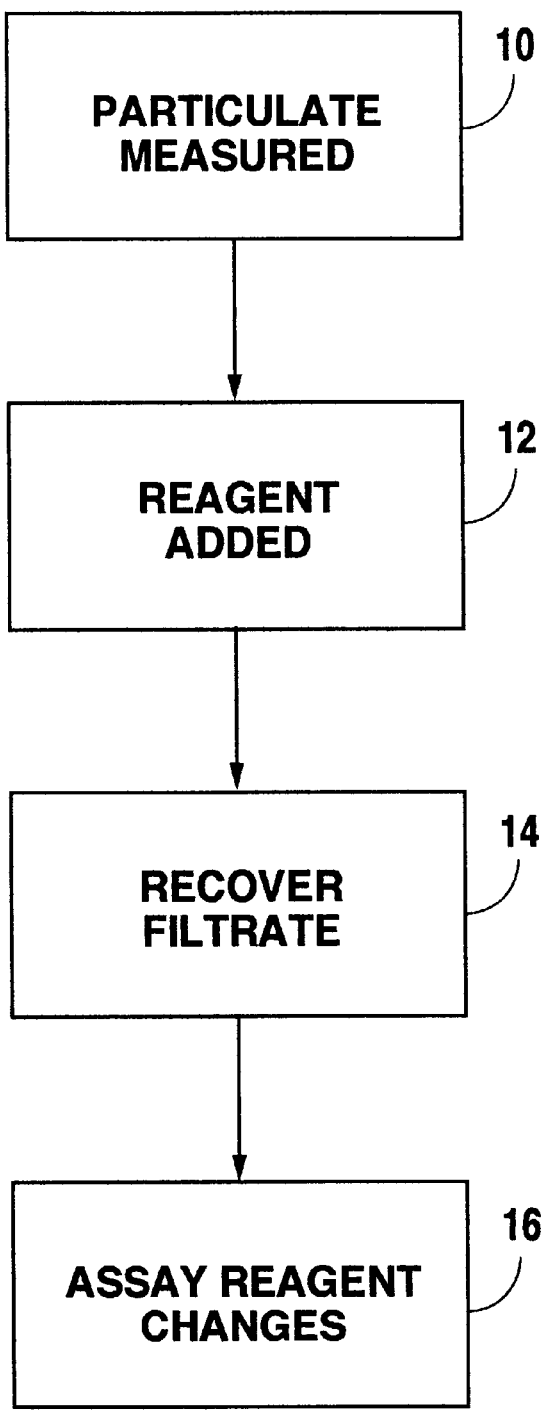
FIG. 4 is a flow chart of the analysis of components of the present invention.

Attention is now directed to FIG. 4 of the drawings. A procedure will be described very briefly, and then particular aspects of that procedure will be discussed in greater detail. Moreover, representative reagents will be identified.

Going to FIG. 4, a procedure is set forth by which a cementitious component particulate is measured. This step 10 involves the segregation of a measured sample. Because it is a sample, it should be taken in a representative proportion. More will be noted concerning that proportion below. Preferably, the particulate sample is taken for measurement from a flowing stream of the component. The different components can be sampled; all of these comprising important constituent parts in the manufacture of cementitious compositions as previously discussed. The size of the particles should be noted. The gravel is graded to any particular size controlled or defined by a screen system. It can be a single size of gravel, or it can be a mix of two or three different sizes, or a range of sizes. In like fashion, the sand can be screened and measured, and can comprise a uniform size, or it can be any size grains in a specified range. Again, both the sand and gravel are commonly obtained by strip mining in river beds and the like. Commonly, the sand and the gravel are screened to a specified standard for each component. The cement may be ground to a selected mesh appropriate for the particular concrete pour specifications. In like fashion, the fly ash which is added to the composition may be ground to a selected mesh for that pour specification. In summary, the process step 10 shown in FIG. 4 involves the obtaining of a measured portion of the particulate material, i.e., specified sample size of a few grams of sufficient particulate material to fill a 200 or 500 ml sample holder.

It The next step 12 shown in FIG. 4 involves the addition of a reagent. There are numerous acid base reagents available.

The preferred reagent is Methylene Blue which is 3, 7-Bis(dimethylamino)phenothiazin-5-ium chloride; C.I. Basic Blue 9; it is sometimes known as methylthionine chloride or tetramethylthionine chloride. It is defined by the formula of $C_{16}H_{18}CIN_3S$. and has molecular weight of 319.85. It commonly is dissolved in water with about one gram dissolved in about 10,000 g water yielding 100 PPM. It has an adsorption wave length peak at about 668 nanometers (nm) and also 609 nm. There are other acid base color indicators, several being listed at pages D-136 and D-137 of the $57^{th}$ Edition of the Handbook of Chemistry and Physics, CRC Press. Returning specifically to the sequence in FIG. 4, the particulate is measured at step 10 and is placed in a container. The reagent, in the presence of water or some other suitable solvent such as alcohol, is then added at step 12. A measured amount of the reagent is used. In the example given above, the reagent is mixed in a ratio of one gram of reagent to 10,000 g of water. That water solution of the reagent is placed in a container and the particulate is added to it. This procedure can progress along either of two routes, i.e., the liquid reagent is added to the particulate or the particulate is added to the liquid. In either instance, the granulated or particulate material is tested by adding the reagent to it, commingling the liquid with the particulate material.

Still referring to FIG. 4, the reagent is separated from the particulate material at step 14, thereby recovering the reagent. Commonly, it is probably easier to place the particulate material in a container and pour the reagent through that container, and then through a simple filter, such as a filter paper. This enables recovery of the liquid reagent. Then the next step 16 is executed, which is the assay of the reagent. Step 16 commonly is done with a first measurement of the reagent in the liquid prior to exposure to the particulate material. The change in color is noted and is an indicator of the amount of chemical reaction that is implicated in this process. It is readily accomplished to measure the change in color before and after readings are taken. This indicates, in some measure, the amount of the color agent which has been tied up in the particulate material.

By way of example, 10 g of a subject fly ash is placed into a beaker containing 50 g of 100 PPM (parts per million) aqueous Methylene Blue solution, with a magnetic stirring bar rotating at approximately 100–200 RPM (revolutions per minute), for a period of five minutes. After five minutes the stirring is stopped and the slurry is allowed to settle for five minutes. An aliquot of the supernatant is drawn through a 13 mm diameter micro-filter with a 0.75 µm pore size borosilicate glass filtering medium affixed onto a syringe. A total of 10 ml of the subject solution is collected. The filtered solution is placed into a glass vial and capped to prevent contamination.

The color of the subject solution can be compared visually with reference standard vials containing different known dye concentrations, such that the dye concentration of the subject material can be determined via the comparison. Standardized color charts can also be used. Alternatively, the dye concentration in the subject sample can be quantified through the use of a photospectrometer.

The adsorptive coefficient or index is calculated by dividing the weight of dye adsorbed from the total aqueous dye solution by the weight of the fly ash used. A typical fly ash adsorptive index is 0.0002 g/g. The remediation chemical that must be added to the fly ash is directly related to the adsorptive index. For example, let a be the proportionality constant. The weight of remediation chemical that must be added to the ash to mitigate the adsorption effect per unit weight of ash is:

Weight of Chemical per Weight of Ash=$\alpha(0.002)$.

The value of $\alpha$ is based upon the specific remediation chemical that is used and the scale of the use of the fly ash. For example, when an inexpensive common surfactant is used as the remediation chemical and fly ash is used to make concrete in a laboratory mixer, $\alpha=0.5$. When the same surfactant is used for remediation and the fly ash is to be used in a commercial central ready-mix plant, $\alpha=1.0$.

As noted above, a can range anywhere from 0.5 up to about 1.0, depending on a number of factors. The $\alpha$ factor also varies dependent upon the remediation material, for example, going from NP-9 to tall oil. Once a is determined for a particular situation, it is relatively constant insofar as physical factors are concerned if they are kept relatively constant.

As previously stated, other techniques may be used to test the particulate component including the BET test.

Although the invention has been described with reference to specific embodiments, this description is not meant to be construed in a limited sense. Various modifications of the disclosed embodiments, as well as alternative embodiments of the invention, will become apparent to persons skilled in the art upon the reference to the description of the invention. It is, therefore, contemplated that the appended claims will cover such modifications that fall within the scope of the invention.

What is claimed is:

1. A method for pretreating a non-aqueous flyash for use in a cementitious composition comprising the steps of:

obtaining said non-aqueous flyash;

treating said flyash with an effective amount of a treatment agent selected from the group consisting of an ethoxylate, sodium lauryl sulfate, and tall oil to lower said adsorption potential of said cementitious composition when water is added to said composition said effective amount of said treatment agent is in the range of about 0.001 wt% to about 20 wt% solid to solid;

adding said treated flyash to said cementitious composition; and adding to said cementitious composition sufficient water to form a cementitious slurry.

2. A method for pretreating a non-aqueous flyash for a cementitious composition to control the adsorption potential of said composition when water is added to said composition to form a cementitious slurry comprising:

obtaining said non-aqueous flyash;

first treating said flyash with an effective amount of a treatment agent selected from the group consisting of a detergent, a surfactant, and an emulsifier to lower said adsorption potential of said composition when said water is added to form said cementitious slurry said effective amount of said treatment agent is in the range of about 0.001 wt % to about 20 wt % solid to solid;

first adding said treated flyash to said cementitious composition to form a cementitious mixture; and second adding to said cementitious mixture sufficient water to form said cementitious slurry.

3. The method of claims 1 or 2 wherein said effective amount of said treatment agent is in the range of about 0.001 wt % to about 2.0 wt % solid to solid.

* * * * *